(12) United States Patent
Cheng (10) Patent No.: US 9,106,400 B2
(45) Date of Patent: Aug. 11, 2015

(54) HYBRID TIMING RECOVERY FOR BURST MODE RECEIVER IN PASSIVE OPTICAL NETWORKS

(71) Applicant: Futurewei Technologies, Inc., Plano, TX (US)

(72) Inventor: Ning Cheng, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 184 days.

(21) Appl. No.: 13/658,341

(22) Filed: Oct. 23, 2012

(65) Prior Publication Data

US 2014/0112356 A1 Apr. 24, 2014

(51) Int. Cl.
*H04J 3/06* (2006.01)
*H04L 7/033* (2006.01)

(52) U.S. Cl.
CPC ............ *H04L 7/0335* (2013.01); *H04L 7/0331* (2013.01)

(58) Field of Classification Search
CPC ............ H04J 14/023; H04J 14/0238–14/0252
USPC .................................................. 370/516, 517
See application file for complete search history.

(56) References Cited

U.S. PATENT DOCUMENTS

| 3,839,599 | A | * | 10/1974 | Pitroda | ......................... 375/371 |
| 3,922,613 | A | * | 11/1975 | Allen et al. | .................... 375/360 |
| 4,119,006 | A | * | 10/1978 | Whitefield | ....................... 84/627 |
| 4,513,427 | A | * | 4/1985 | Borriello et al. | .............. 375/360 |
| 4,617,679 | A | * | 10/1986 | Brooks | ......................... 375/374 |
| 4,868,514 | A | * | 9/1989 | Azevedo et al. | ............... 327/159 |
| 5,081,655 | A | * | 1/1992 | Long | .............................. 375/373 |
| 5,155,487 | A | * | 10/1992 | Tanaka et al. | ................. 341/100 |
| 5,293,170 | A | * | 3/1994 | Lorenz et al. | ................. 342/352 |
| 5,305,322 | A | * | 4/1994 | Kabaya et al. | ................ 370/505 |
| 5,394,024 | A | * | 2/1995 | Buckenmaier et al. | ........ 327/160 |
| 5,550,514 | A | * | 8/1996 | Liedberg | ....................... 331/1 A |
| 5,589,788 | A | * | 12/1996 | Goto | .............................. 327/276 |
| 5,768,283 | A | * | 6/1998 | Chaney | ......................... 714/700 |
| 5,799,051 | A | * | 8/1998 | Leung et al. | .................. 375/376 |

(Continued)

FOREIGN PATENT DOCUMENTS

CN 101931398 A 12/2010

OTHER PUBLICATIONS

Eldering, C., et al., "Digital Burst Mode Clock Recovery Technique for Fiber-Optic Systems," Journal of Lightwave Technology, vol. 12, No. 2, Feb. 1994, pp. 271-279.

(Continued)

*Primary Examiner* — Bunjob Jaroenchonwanit
(74) *Attorney, Agent, or Firm* — Conley Rose, P.C.; Grant Rodolph; Jonathan K. Polk (57) ABSTRACT

An apparatus for coarse phase alignment of an analog signal comprising: a tapped delay line, a coarse phase alignment logic circuit coupled to the tapped delay line, and a selector coupled to the tapped delay and the coarse phase alignment logic circuit. An apparatus for timing and data recovery for burst mode receivers comprising: a receiver, a coarse phase alignment circuit coupled to the receiver, at least one analog to digital converter (ADC) coupled to the coarse phase alignment circuit such that the coarse phase alignment circuit is positioned between the receiver and the ADC, and a fine phase alignment circuit coupled to the ADC such that the ADC is positioned between the coarse phase alignment circuit and the fine phase alignment circuit, wherein the fine phase alignment circuit produces a recovered data output.

19 Claims, 8 Drawing Sheets

(56) References Cited

U.S. PATENT DOCUMENTS

| | | | | |
|---|---|---|---|---|
| 5,945,862 | A * | 8/1999 | Donnelly et al. | 327/278 |
| 5,955,907 | A * | 9/1999 | Niijima | 327/262 |
| 6,031,401 | A * | 2/2000 | Dasgupta | 327/116 |
| 6,128,359 | A * | 10/2000 | Volk | 375/371 |
| 6,208,667 | B1 * | 3/2001 | Caldara et al. | 370/503 |
| 6,549,596 | B1 * | 4/2003 | Cretti et al. | 375/373 |
| 6,658,457 | B2 * | 12/2003 | Nishikawa et al. | 709/206 |
| 7,123,882 | B1 * | 10/2006 | Frazier | 455/73 |
| 7,502,278 | B1 * | 3/2009 | Imbornone et al. | 367/103 |
| 7,773,667 | B2 * | 8/2010 | Sindalovsky et al. | 375/224 |
| 7,773,713 | B2 * | 8/2010 | Cafaro et al. | 375/373 |
| 8,111,993 | B2 * | 2/2012 | Lowery et al. | 398/81 |
| 2002/0054409 | A1 * | 5/2002 | Bartur et al. | 359/152 |
| 2003/0012322 | A1 * | 1/2003 | Partsch et al. | 375/376 |
| 2003/0058930 | A1 * | 3/2003 | Sawada et al. | 375/233 |
| 2003/0155490 | A1 * | 8/2003 | Medard et al. | 250/227.14 |
| 2003/0215039 | A1 * | 11/2003 | Block et al. | 375/376 |
| 2004/0022311 | A1 * | 2/2004 | Zerbe et al. | 375/229 |
| 2004/0116160 | A1 * | 6/2004 | Deas et al. | 455/570 |
| 2004/0247041 | A1 * | 12/2004 | Biedka et al. | 375/295 |
| 2005/0007165 | A1 * | 1/2005 | Sadowski | 327/141 |
| 2005/0163252 | A1 * | 7/2005 | McCallister et al. | 375/296 |
| 2005/0270073 | A1 * | 12/2005 | Lee et al. | 327/99 |
| 2006/0071698 | A1 * | 4/2006 | Parikh | 327/231 |
| 2006/0098771 | A1 * | 5/2006 | Cafaro et al. | 375/371 |
| 2006/0120733 | A1 * | 6/2006 | Tucker et al. | 398/204 |
| 2006/0145741 | A1 * | 7/2006 | Panpalia et al. | 327/158 |
| 2006/0198634 | A1 * | 9/2006 | Ofalt et al. | 398/16 |
| 2006/0273836 | A1 * | 12/2006 | Lin | 327/158 |
| 2008/0025733 | A1 * | 1/2008 | Nazarathy et al. | 398/209 |
| 2009/0028554 | A1 * | 1/2009 | Anderson et al. | 398/25 |
| 2009/0129446 | A1 * | 5/2009 | Wilhite et al. | 375/147 |
| 2009/0201796 | A1 * | 8/2009 | Roberts et al. | 370/210 |
| 2009/0256622 | A1 * | 10/2009 | Roberts | 327/512 |
| 2010/0135652 | A1 * | 6/2010 | Jiang et al. | 398/10 |
| 2010/0315141 | A1 * | 12/2010 | Cao et al. | 327/161 |
| 2010/0321072 | A1 * | 12/2010 | Bauwelinck et al. | 327/142 |
| 2010/0329403 | A1 | 12/2010 | Beukema et al. | |
| 2011/0018748 | A1 * | 1/2011 | Ratnakar Aravind et al. | 341/111 |
| 2011/0185215 | A1 * | 7/2011 | Neben | 713/401 |
| 2011/0298511 | A1 * | 12/2011 | Swanson et al. | 327/160 |
| 2011/0317752 | A1 * | 12/2011 | Born et al. | 375/232 |
| 2012/0062331 | A1 | 3/2012 | Ravi et al. | |
| 2012/0099857 | A1 * | 4/2012 | Zhang et al. | 398/38 |
| 2012/0304241 | A1 * | 11/2012 | Boyd et al. | 725/129 |
| 2012/0313683 | A1 * | 12/2012 | Rylov | 327/250 |
| 2013/0016982 | A1 * | 1/2013 | Henzler | 398/161 |
| 2013/0021073 | A1 * | 1/2013 | Kim | 327/158 |
| 2013/0120170 | A1 * | 5/2013 | Gupta et al. | 341/110 |
| 2013/0216228 | A1 * | 8/2013 | Nazarathy et al. | 398/65 |
| 2013/0259174 | A1 * | 10/2013 | Qian et al. | 375/346 |

OTHER PUBLICATIONS

Gu, G., et al., "A Gated VCO for 10 Gb/s PON Systems in 0.18μm CMOS, 2010 Second International Conference on Future Networks," IEEE Computer Society, 2010, pp. 261-264.

Ota, Y., et al., "High-Speed, Burst-Mode, Packet-Capable Optical Receiver and Instantaneous Clock Recovery for Optical Bus Operation," Journal of Lightwave Technology, vol. 12, No. 2, Feb. 1994, pp. 325-331.

Suzuki, N., et al., "Over-Sampling Based Burst-Mode CDR Technology for High-Speed TDM-PON Systems," OThT3.pdf, Optical Fiber Communications Conference, OSA Technical Digest (CD), Optical Society of America, 2011, 3 pages.

Foreign Communication From A Counterpart Application, PCT Application No. PCT/CN2013/085761, International Search Report dated Jan. 30, 2014, 6 pages.

Foreign Communication From A Counterpart Application, PCT Application No. PCT/CN2013/085761, Written Opinion dated Jan. 30, 2014, 4 pages.

"Series G: Transmission Systems and Media, Digital Systems and Networks, Digital Sections and Digital Line Systems—Optical Line Systems for Local and Access Networks, Gigabit-Capable Passive Optical Networks (GPON): General Characteristics," ITU-T, Telecommunication Standardization Sector of ITU, G.984.1, Mar. 2008, 43 pages.

"Series G: Transmission Systems and Media, Digital Systems and Networks, Digital Sections and Digital Line Systems—Optical Line Systems for Local and Access Networks, Gigabit-capable Passive Optical Networks (GPON): General Characteristics, Amendment 1," ITU-T, Telecommunications Standardization Sector of ITU, G.984.1, Amendment 1, Oct. 2009, 8 pages.

"Series G: Transmission Systems and Media, Digital Systems and Networks, Digital Sections and Digital Line Systems—Optical Line Systems for Local and Access Networks, Gigabit Capable Passive Optical Networks (GPON): General Characteristics, Amendment 2," ITU-T, Telecommunication Standardization Sector of ITU, G.984.1, Amendment 2, Apr. 2012, 16 pages.

"Series G: Transmission Systems and Media, Digital Systems and Networks, Digital Sections and Digital Line Systems—Optical Line Systems for Local and Access Networks, Gigabit-capable Passive Optical Networks (GPON): Physical Media Dependent (PMD) layer Specification," ITU-T, Telecommunication Standardization Sector of ITU, G.984.2, Mar. 2003, 38 pages.

"Series G: Transmission Systems and Media, Digital Systems and Networks, Digital Sections and Digital Line Systems—Optical Line Systems for Local and Access Networks, Gigabit-capable Passive Optical Networks (G-PON): Physical Media Dependent (PMD) layer Specification, Amendment 1: New Appendix III—Industry best Practice for 2.488 Gbit/s downstream, 1.244 Gbit/s upstream G-PON," ITU-T, Telecommunication Standardization Sector of ITU, G.984.2, Amendment 1, Feb. 2006, 12 pages.

"Series G. Transmission Systems and Media, Digital Systems and Networks, Digital Sections and Digital Line Systems—Optical Line Systems for Local and Access Networks, Gigabit-Capable Passive Optical Networks (G-PON): Physical Media Dependent (PMD) Layer Specification, Amendment 2," ITU-T, Telecommunication Standardization Sector of ITU, G.984.2, Amendment 2, Mar. 2008, 16 pages.

"Series G: Transmission Systems and Media, Digital Systems and Networks, Digital Sections and Digital Line Systems—Optical Line Systems for Local and Access Networks, Gigabit-capable Passive Optical Networks (G-PON): Transmission Convergence Layer Specification," ITU-T, Telecommunication Standardization Sector of ITU, G.984.3, Mar. 2008, 146 pages.

"Series G: Transmission Systems and Media, Digital Systems and Networks, Digital Sections and Digital Line Systems—Optical Line Systems for Local and Access Networks, Gigabit-capable Passive Optical Networks (G-PON): Transmission Convergence Layer Specification, Amendment 1—Specification of the ONU Registration Method and Various Clarifications," ITU-T, Telecommunication Standardization Sector of ITU, G.984.3, Amendment 1, Feb. 2009, 16 pages.

"Series G: Transmission Systems and Media, Digital Systems and Networks, Digital Sections and Digital Line Systems—Optical Line Systems for Local and Access Networks, Gigabit-capable Passive Optical Networks (G-PON): Transmission Convergence Layer Specification, Amendment 2: Time-of-day Distribution and Maintenance Updates and Clarifications," ITU-T, Telecommunication Standardization Sector of ITU, G.984.3, Amendment 2, Nov. 2009, 18 pages.

"Series G: Transmission Systems and Media, Digital Systems and Networks, Digital Sections and Digital Line Systems—Optical Line Systems for Local and Access Networks, Gigabit-capable Passive Optical Networks (G-PON): Transmission Convergence Layer Specification, Amendment 3," ITU-T, Telecommunication Standardization Sector of ITU, G.984.3, Amendment 3, Apr. 2012, 18 pages.

"Covering Note, Gigabit-capable Passive Optical Networks (G-PON): Transmission Convergence Layer Specification, General Secretariat of The International Telecommunications Union, ITU-Telecommunication Standardization Sector, ITU-T G.984.3," Erratum 1, Apr. 28, 2010, 1 pages.

"Series G: Transmission Systems and Media, Digital Systems and Networks, Implementers' Guide for ITU-T Rec. G.984.3, Gigabit-capable Passive Optical Networks (G-PON): Transmission Conver- (56) References Cited

OTHER PUBLICATIONS gence Layer Specification," ITU-T, Telecommunication Standardization Sector of ITU, G.984.3, Implementers' Guide, Feb. 17, 2006, 20 pages.

"Series G: Transmission Systems and Media, Digital Systems and Networks, Digital Sections and Digital Line Systems—Optical Line Systems for Local and Access Networks," Gigabit-Capable Passive Optical Networks (G-PON): ONT Management and Control Interface Specification, G.984.4, Feb. 2008, 430 pages.

"Series G: Transmission Systems and Media, Digital Systems and Networks, Digital Sections and Digital Line Systems—Optical Line Systems for Local and Access Networks, Gigabit-Capable Passive Optical Networks (G-PON): ONT Management and Control Interface Specification, Amendment 1," G.984.4, Amendment 1, Jun. 2009, 92 pages.

"Series G: Transmission Systems and Media, Digital Systems and Networks, Digital Sections and Digital Line Systems—Optical Line Systems for local and Access Networks, Gigabit-capable Passive Optical Networks (G-PON): ONT Management and Control Interface Specification, Amendment 2: Changes and Extensions to the OMCI, Editorial Clarifications and Corrections," ITU-T, Telecommunication Standardization Sector of ITU, G.984.4, Amendment 2, Nov. 2009, 164 pages.

"Series G: Transmission Systems and Media, Digital Systems and Networks, Digital Sections and Digital Line Systems—Optical Line Systems for Local and Access Networks, Gigabit-capable Passive Optical Networks (G-PON): ONT Management and Control Interface Specification, Amendment 3: Clarification of Scope of Application," G984.4, Amendment 3, Jul. 2010, 10 pages.

"Series G: Transmission Systems and Media, Digital Systems and Networks, Digital Sections and Digital Line Systems—Optical Line Systems for Local and Access Networks, Gigabit-capable Passive Optical Networks (G-PON): ONT Management and Control Interface Specification, Corrigendum 1," G.984.4, Corrigendum 1, Mar. 2010, 8 pages.

"Covering Note, General Secretariat of the International Telecommunication Union, ITU-T G.984.4, Gigabit-capable Passive Optical Networks (G-PON): ONT Management and Control Interface Specification, Erratum 1," ITU—Telecommunication Standardization Sector, G.984.4, Erratum 1, Aug. 12, 2009, 2 pages.

"G.984.4 Implementers Guide, Second Revision," Oct. 2009, 100 pages.

"Series G: Transmission Systems and Media, Digital Systems and Networks, Digital Sections and Digital Line Systems—Optical Line Systems for Local and Access Networks, Gigabit-capable Passive Optical Networks (GPON): Long Reach," ITU-T, Telecommunication Standardization Sector of ITU, G.984.7, Sep. 2010, 14 pages.

"Series G: Transmission Systems and Media, Digital Systems and Networks, Digital Sections and Digital Line Systems—Optical Line Systems for Local and Access Networks, Gigabit-capable Passive Optical Networks (G-PON): Enhancement Band," ITU-T, Telecommunication Standardization Sector of ITU, G.984.5, Sep. 2007, 22 pages.

"Series G: Transmission Systems and Media, Digital Systems and Networks, Digital Sections and Digital Line Systems—Optical Line Systems for Local and Access Networks, Gigabit-Capable Passive Optical Networs (G-PON): Enhancement Band, Amendment 1," ITU-T, Telecommunication Standardization Sector, G.984.5, Amendment 1, Oct. 2009, 12 pages.

"Series G: Transmission Systems and Media, Digital Systems and Networks, Digital Sections and Digital Line Systems—Optical Line Systems for Local and Access Networks, Gigabit-Capable Passive Optical Networks (GPON): Reach Extension," ITU-T Telecommunication Standardization Sector of ITU, G984.6, Mar. 2008, 40 pages.

"Series G: Transmission Systems and Media, Digital Systems and Networks, Digital Sections and Digital Line Systems—Optical Line Systems for Local and Access Networks, Gigabit Capable Passive Networks (GPON): Reach Extension, Amendment 1: Wavelength-Converting Continuous Mode and 1:N-Protected Range Extenders," ITU-T, Telecommunication Standardization Sector of ITU, G.984.6, Amendment 1, Nov. 2009, 28 pages.

"Series G: Transmission Systems and Media, Digital Systems and Networks, Digital Sections and Digital Line Systems—Optical Line Systems for Local and Access Networks, Gigabit-Capable Passive Optical Networks (G-PON): Reach Extension, Amendment 2," G.984.6, Amendment 2, May 2012, 16 pages.

\* cited by examiner

| Input from D flip-flops | | | | 4:1 demux Input | | 4:1 demux Output |
|---|---|---|---|---|---|---|
| Q3 | Q2 | Q1 | Q0 | SEL1 | SEL0 | |
| 1 | 0 | 0 | 0 | 0 | 0 | D3 |
| 1 | 1 | 0 | 0 | 0 | 1 | D2 |
| 1 | 1 | 1 | 0 | 1 | 0 | D1 |
| 1 | 1 | 1 | 1 | 1 | 1 | D0 |
| 0 | 1 | 1 | 1 | 0 | 0 | D3 |
| 0 | 0 | 1 | 1 | 0 | 1 | D2 |
| 0 | 0 | 0 | 1 | 1 | 0 | D1 |
| 0 | 0 | 0 | 0 | 1 | 1 | D0 |
| 0 | 0 | 1 | 0 | * | * | |
| 0 | 1 | 0 | 0 | * | * | |
| 0 | 1 | 0 | 1 | * | * | |
| 0 | 1 | 1 | 0 | * | * | |
| 1 | 0 | 0 | 1 | * | * | |
| 1 | 0 | 1 | 0 | * | * | |
| 1 | 0 | 1 | 1 | * | * | |
| 1 | 1 | 0 | 1 | * | * | |

HYBRID TIMING RECOVERY FOR BURST MODE RECEIVER IN PASSIVE OPTICAL NETWORKS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. Time Division Multiplexing (TDM) PONs, such as Gigabit PONs (GPONs) and Ethernet PONs (EPONs), can serve potentially millions of users worldwide. In some PON systems, such as GPON systems, downstream data is broadcasted at about 2.5 Gigabits per second (Gbps) while upstream data is transmitted at about 1.25 Gbps. However, the bandwidth capability of the PON systems is expected to increase as the demands for services increase. To meet the increased demand in services, the logic devices in emerging PON systems, such as Next Generation Access (NGA), are being reconfigured to transport the data frames at higher bandwidths, for example at about ten Gbps, and to support a larger number of ONUs.

Optical network units (ONUs) utilizing such technology commonly share upstream bandwidth using time division multiple access (TDMA) schemes. More specifically, data from ONUs are sent to optical line terminals (OLTs) burst-by-burst. Burst data from different ONUs frequently contains analog signals of different amplitudes and phases.

Achieving burst-mode clock and data recovery in a short time period is desirable for compliance with the relevant standards. For example, the International Telecommunication Union Telecommunication Standardization Sector (ITU-T) G.984 standard specifies a 44 bit period recovery for GPON. Prior approaches to burst-mode clock and data recovery included phase locked loops (either analog or digital) and fast clock recovery circuitry. Because phase locked loops require thousands of bits to achieve suitable phase locking, conventional PON systems use fast clock recovery circuitry. Conventional fast clock recovery circuits generally employ one of two approaches: gated voltage controlled oscillators (gated VCOs) or over-sampling. Gated VCO systems are inexpensive but demonstrate relatively poor performance characteristics. Over-sampling systems demonstrate relatively better performance characteristics but are expensive and difficult to implement as data rate in PON upstream increases. Thus, a need exists for a relatively low-cost means for clock and data recovery for burst mode transmissions with relatively good performance characteristics.

SUMMARY

In one embodiment, the disclosure includes an apparatus for coarse phase alignment of an analog signal comprising: a tapped delay line, a coarse phase alignment logic circuit coupled to the tapped delay line, and a selector coupled to the tapped delay and the coarse phase alignment logic circuit.

In another embodiment, the disclosure includes an apparatus for timing and data recovery for burst mode receivers comprising: a receiver, a coarse phase alignment circuit coupled to the receiver, at least one analog to digital converter (ADC) coupled to the coarse phase alignment circuit such that the coarse phase alignment circuit is positioned between the receiver and the ADC, and a fine phase alignment circuit coupled to the ADC such that the ADC is positioned between the coarse phase alignment circuit and the fine phase alignment circuit, wherein the fine phase alignment circuit produces a recovered data output.

In yet another embodiment, the disclosure includes a method of burst mode clock and data recovery at an OLT in a PON comprising the steps of: receiving an upstream analog signal, aligning a coarse phase for the upstream analog signal, converting the coarse phase aligned upstream analog signal to a digital signal, aligning a fine phase for the digital signal, and outputting a recovered data signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods directed to hybrid approaches for burst mode timing recovery. The hybrid approaches use over-sampling techniques for rapid coarse phase alignment followed by digital timing recovery techniques for fine phase alignment. In such systems and methods, the two-step approach coarsely aligns the phase of the analog signal using over-sampling, converts the analog signal to digital, and finely aligns the phase of the digital signal using digital timing recovery techniques. Consequently, such hybrid approaches combine the fast phase locking and superior jitter tolerance of previous approaches to burst mode timing recovery.

Figure 1:
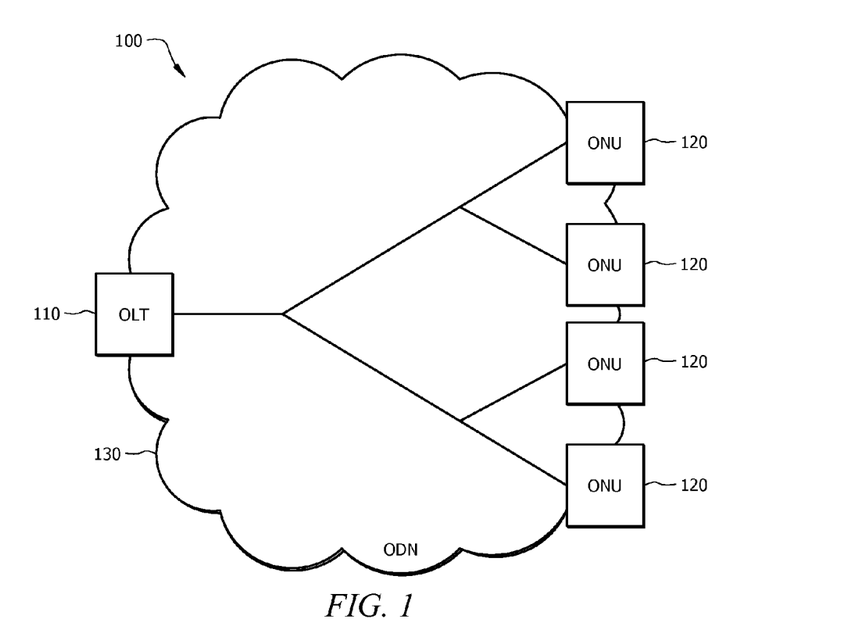
FIG. 1 depicts a schematic diagram of an embodiment of a PON.

FIG. 1 depicts a schematic diagram of an embodiment of a PON 100. The PON 100 comprises an OLT 110, a plurality of ONUs 120, and an ODN 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. In an embodiment, the PON 100 may be a Next Generation Access (NGA) system, such as a ten Gbps GPON (XGPON), which may have a downstream bandwidth of about ten Gbps and an upstream bandwidth of at least about 2.5 Gbps. Alternatively, the PON 100 may be any Ethernet based network, such as an EPON defined by the Institute of Electrical and Electronics Engineers (IEEE) 802.3ah standard, a 10 Gigabit EPON as defined by the IEEE 802.3av standard, an asynchronous transfer mode PON (APON), a broadband PON (BPON) defined by the ITU-T G.983 standard, a GPON defined by the ITU-T G.984 standard, a wavelength division multiplexed (WDM) PON (WPON), or a suitable after-arising technology, all of which are incorporated herein by reference as if reproduced in their entirety.

In an embodiment, the OLT 110 may be any device configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network uses a network protocol, such as Ethernet or Synchronous Optical Networking/Synchronous Digital Hierarchy (SONET/SDH), which differs from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to a customer device. In some embodiments, ONUs 120 and optical network terminals (ONTs) are similar, and thus the terms are used interchangeably herein. The ONUs 120 may be typically located at distributed locations, such as the customer premises, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. Alternatively, the ODN 130 may comprise one or a plurality of active components, such as optical amplifiers. The ODN 130 may typically extend from the OLT 110 to the ONUs 120 in a branching configuration as shown in FIG. 1, but may be alternatively configured in any other point-to-multi-point configuration.

Figure 2:
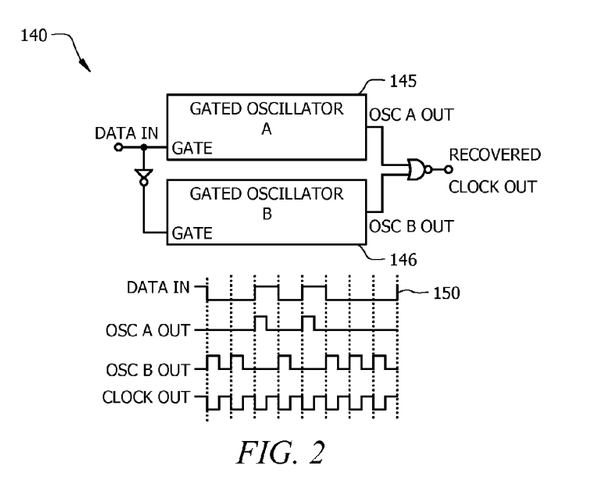
FIG. 2 depicts a schematic diagram of an embodiment of a gated VCO system.
Figure 3:
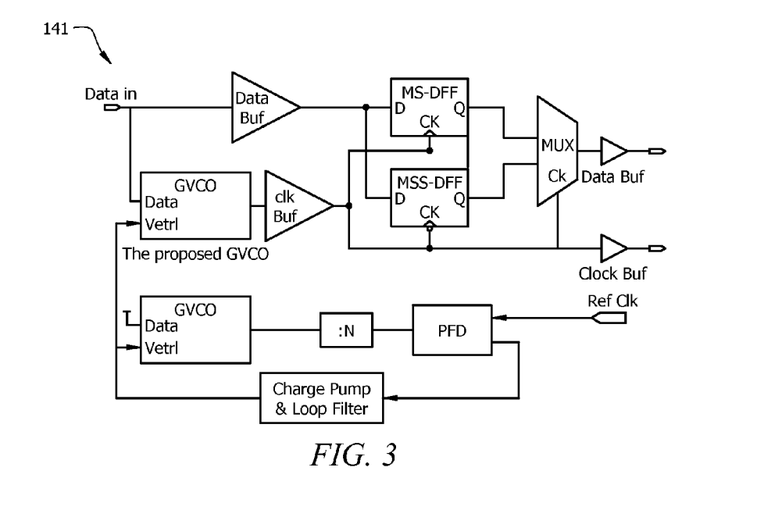
FIG. 3 depicts a schematic diagram of another embodiment of a gated VCO system.

FIGS. 2 and 3 depict schematic diagrams of gated VCO systems 140, 141. In FIG. 2, two oscillators 145, 146 are gated by the input burst mode data sequence 150. When data is high, oscillator 145 produces periodical clock pulses while oscillator 146 is off. The combination of both oscillators' 145, 146 outputs results in a continuous clock corresponding roughly to the bit rate of the input data. FIG. 3 operates according to substantially the same principles.

Gated VCO systems have the advantage of simplicity and, consequently, low cost. Gated VCO systems may recover the clock within one bit. However, gated VCOs rely on oscillators whose frequency differs slightly, producing some amount of deterministic jitter on the recovered clock depending on the received data pattern. Further, the random jitter from the data passes through to the recovered clock without any filtering, creating poor overall performance.

Figure 4:
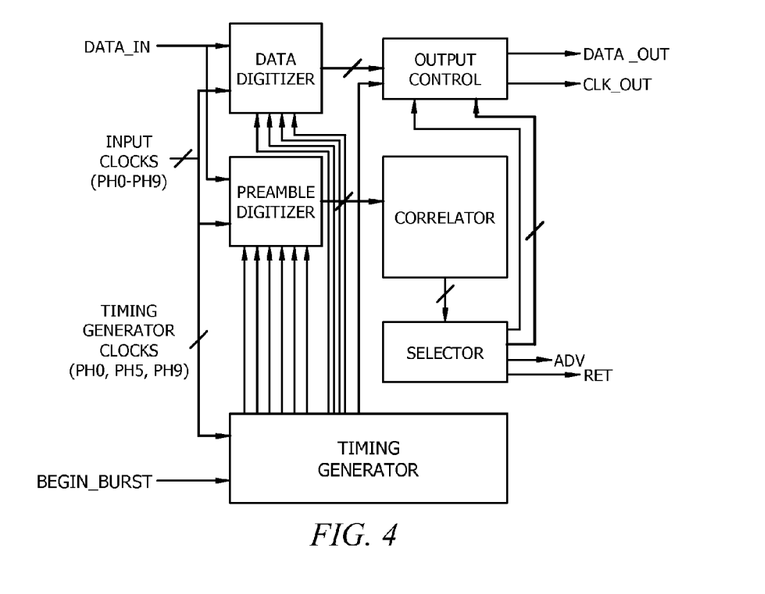
FIG. 4 depicts schematic diagram of an embodiment of an over-sampling system.
Figure 5:
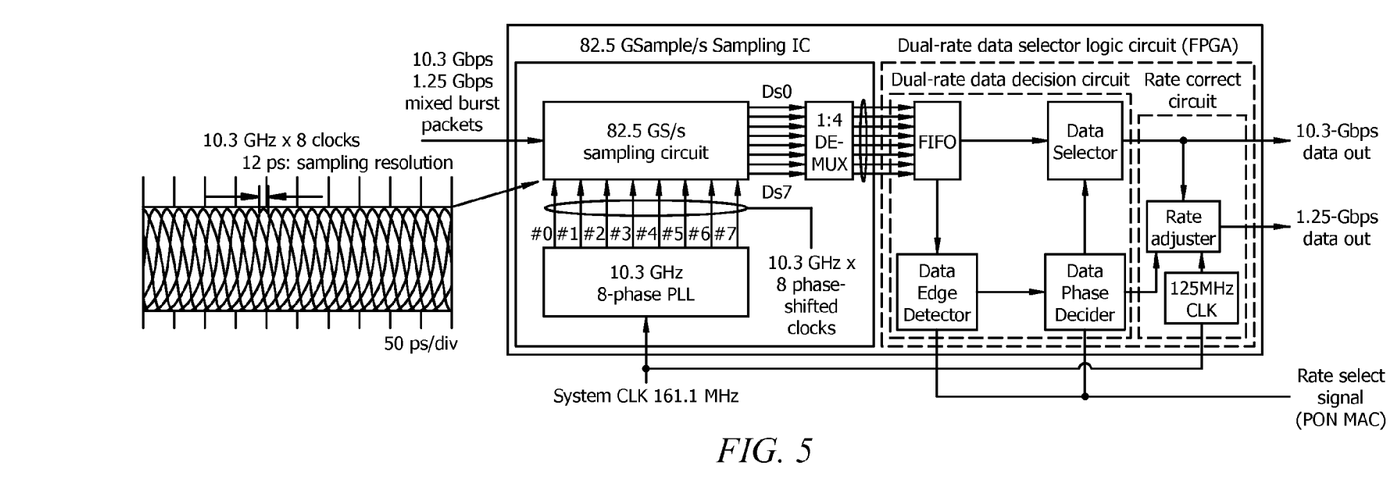
FIG. 5 depicts schematic diagram of another embodiment of an over-sampling system.

FIGS. 4 and 5 depict schematic diagrams of over-sampling systems. FIG. 4 represents a demonstration of burst-mode timing and data recovery with over-sampling. FIG. 5 represents an implementation of over-sampling for 10 Gbps burst-mode receivers. In over-sampling approaches, a fast sampler produces a few samples for each incoming bit (typically 8 samples per bit). A digital logic selects a sampling time (corresponding to one of the sample in each bit) for data recovery.

Over-sampling approaches provide better jitter performance than gated VCO approaches. By utilizing a few samples for each incoming bit, over-sampling systems may achieve better overall performance than gated VCO systems. However, the number of samples per bit results in sampling rates well in excess of data rates. Over-sampling generally requires a fast sampler and hence generally costs more than gated VCO systems. For example, an XGPON system with a 2.5 Gbps upstream data rate may require 20 Gbps sampling. Samplers capable of such sampling rates are expensive and difficult to implement with current technology.

Figure 6:
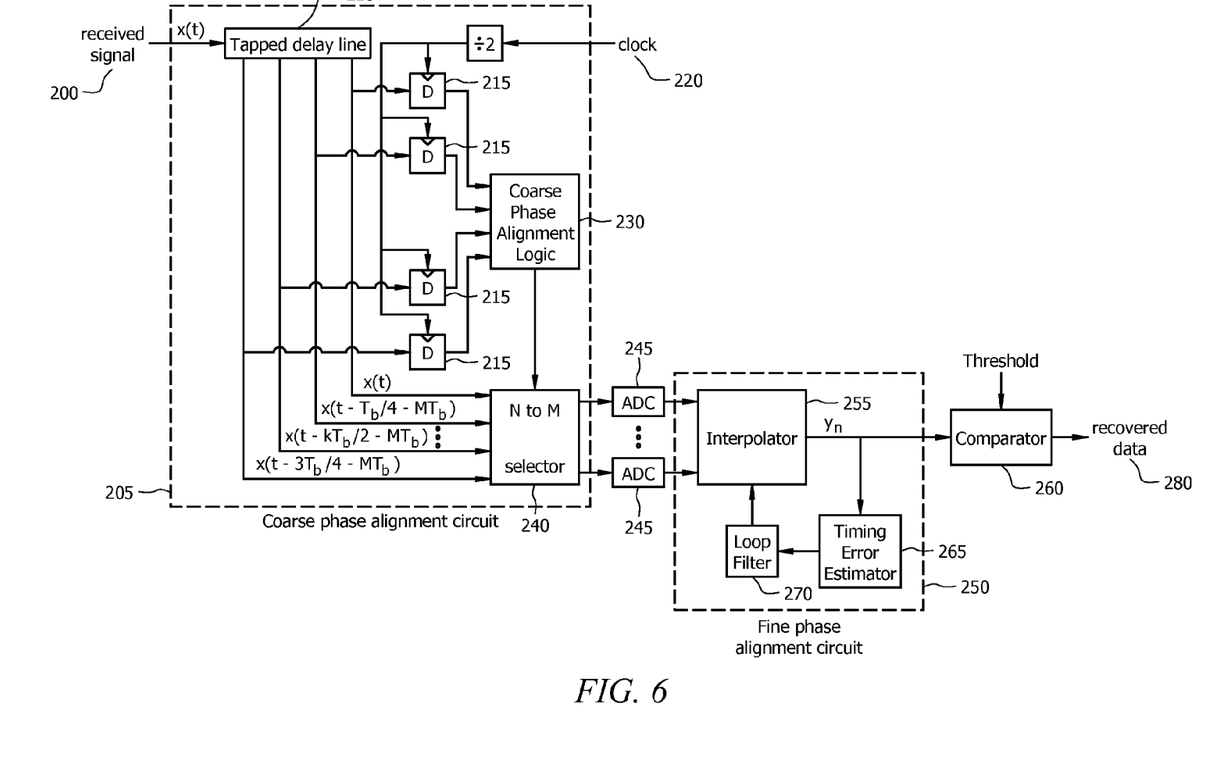
FIG. 6 depicts a schematic diagram of an embodiment of a hybrid timing and data recovery for burst-mode receiver.

FIG. 6 depicts a schematic diagram of one embodiment of a hybrid timing and data recovery for burst-mode receiver, which may be used in the OLT and/or ONU described above under the discussion of FIG. 1. Generally, the hybrid timing and data recovery for burst-mode receiver may comprise a coarse phase alignment circuit 205 that performs a coarse phase alignment on a received signal 200 (which may be an analog signal), and one or more ADCs 245 that convert the coarse phase aligned analog signal(s) into one or more digital signals. The hybrid timing and data recovery for burst-mode receiver may also comprise a fine phase alignment circuit 250 that performs a fine phase alignment on the digital signal(s), and a comparator 260 that compares the fine phase aligned digital signal with one or more thresholds and produces the recovered data 280. Further details of the coarse phase alignment circuit 205, the ADCs 245, the fine phase alignment circuit 250, and the comparator 260 are provided below.

A received signal 200 may enter the coarse phase alignment circuit 205 at a tapped delay line 210. The tapped delay line 210 may delay the received signal 200 for some predetermined time, and may divide the received signal 200 into two or more delayed signals. For example, the delay line 210 may output N delayed versions of received signal 200 each having a delay, $t_{d,k}$:

$$t_{d,k} = kT_b/N + MT_b$$

where k=0, 1, 2, ..., N−1, $T_b$ is the bit period, N may be any integer selected based on the number of desired signals, and M is an integer that is based on the number of desired signals output to the ADCs 245. FIG. 6 depicts the delay equations for each of the delayed, divided signals along the outputs of the tapped delay line 210. The resulting N delayed, divided signals may each be further split and one version passed to each of a plurality of flip-flops 215 and a selector 240. The flip-flops 215 may be gated D-latches, though suitable alternatives to gated D-latch flip-flops exist and are within the scope of this disclosure as will be understood to one having ordinary skill in the relevant art. The number of flip-flops 215 may directly correspond to N. The flip-flops 215 may receive a modified (e.g., half) or an unmodified rate input from system clock 220, where modified rate input may be preferred to utilize a single ADC 245 and an umodified rate input may be useful for utilizing multiple ADCs 245, as discussed further herein. The flip-flops 215 may receive the delayed signals as a data input (D) and the rate input from system clock 220 as a gate input (G), thereby operating as a transparent latch to output the D value when G=1, and may output the resulting data to coarse phase alignment logic circuit 230. The D flip-flop may optionally be level triggered or edge triggered within the scope of this disclosure.

Figure 8:
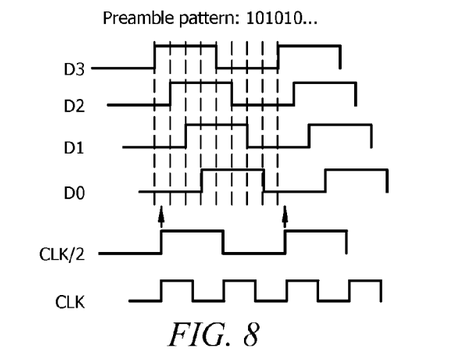
FIG. 8 depicts the comparator and clock outputs corresponding to FIG. 7.

The coarse phase alignment logic circuit 230 may select M out of the N delayed versions of the received signal 200 using a processing routine further described under the discussion of FIG. 8. The coarse phase alignment logic circuit 230 may subsequently inform the N to M selector 240 which M out of the N delayed versions of the received signal 200 to select using one or more selection signals as may be needed to identify. N to M selector 240, also referred to as a demultiplexer or demux, may receive the N delayed signals from tapped delay line 210 as well as the selection signal(s) from the coarse phase alignment logic circuit 230. The selection signal(s) from the coarse phase alignment logic circuit 230 may instruct N to M selector 240 which M of the N delayed signals coarsely aligns with the clock, and N to M selector 240 may forward the selected M signals to the ADCs 245. Thus, the coarse phase alignment circuit 205 may align the received signal 200 (e.g., a preamble) and clock 220 (e.g., the center of the bit period coarsely aligns with the falling edge of the clock signal) within $T_b/N$. After the preamble, the coarse phase alignment logic locks and the selection signal(s) is sustained over the remaining burst period. Alternately, the coarse phase alignment and selection signal(s) may be readjusted as needed after the preamble.

Data may pass out of the coarse phase alignment circuit 205 at N to M selector 240 to the ADCs 245. The ADCs 245 are well known in the art, and each ADC 245 may run at the nominal bit rate and may convert one of the analog signals from N to M selector 240 into a digital signal. The digital signals output from ADCs 245 may then be sent to the fine phase alignment circuit 250.

The fine phase alignment circuit 250 may use a conventional digital loop with interpolator 255. Specifically, the digital outputs of ADCs 245 may enter the fine phase alignment circuit 250 at interpolator 255. Interpolator 255 may measure the fraction of a clock period, e.g., the time between a clock event and the event being measured, and may be a ramp interpolator, a vernier interpolator, or other suitable device as known in the art. The output of interpolator 255 may be split with one signal going to a comparator 260 and another signal going to a timing error estimator 265. The timing error estimator 265 may estimate the timing error in the digital timing recovery loop, $e_n$, for example using the Gardner algorithm:

$$e_n = (y_n - y_{n-2}) \cdot y_{n-1}$$

where $y_n$ is the current sample, $y_{n-1}$ is the previous sample, $y_{n-2}$ is the sample prior to $y_{n-1}$, the spacing between $y_n$ and $y_{n-2}$ is T seconds, and the spacing between $y_n$ and $y_{n-1}$ is T/2 seconds. The timing error estimator 265 may pass the resulting data to a loop filter 270, which may determine the noise and/or jitter of the signal and the associated filtering required to improve the signal quality. The loop filter 270 may pass the resulting data back to interpolator 255 as feedback for noise and/or jitter tolerance control.

The output of the fine phase alignment circuit 250 (e.g., the output from interpolator 255) may be sent to a comparator 260. Comparator 260 may further receive a threshold parameter, and may compare the output of interpolator 255 to the threshold parameter. The comparator 260 may output recovered data 280 as a sequence of bits, wherein a "1" is output when the output of interpolator 255 is above the threshold and a "0" is output when the output of interpolator 255 is at or below the threshold.

Figure 7:
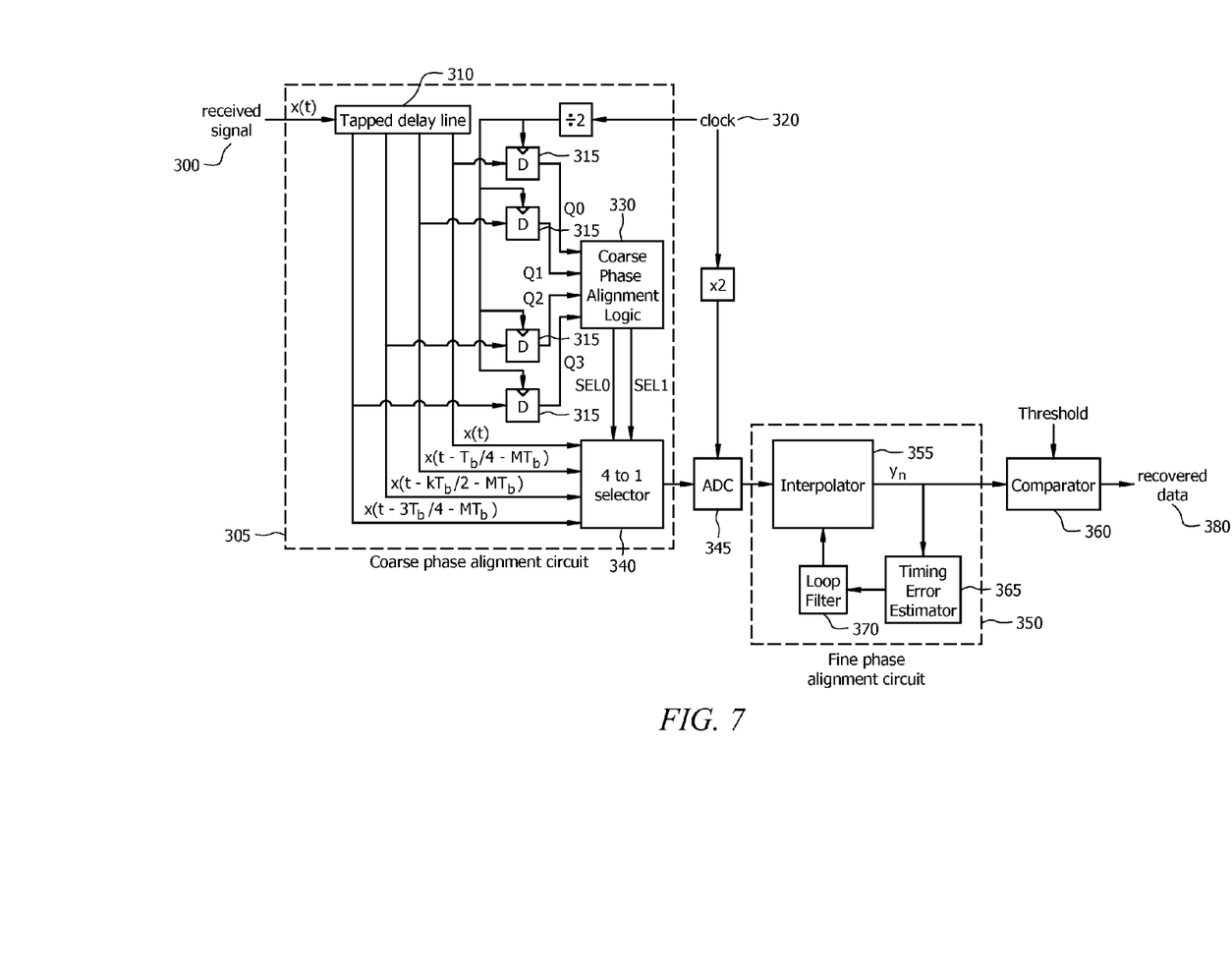
FIG. 7 depicts a schematic diagram of another embodiment of a hybrid timing and data recovery for burst-mode receiver.

FIG. 7 depicts a schematic diagram of another embodiment of a hybrid timing and data recovery for burst-mode receiver, which may be used in the OLT and/or ONU described above. The hybrid timing and data recovery for burst-mode receiver of the depicted embodiment comprises: a received signal 300, a coarse phase alignment circuit 305 comprising a tapped delay line 310, a plurality of flip flops 315, a coarse phase alignment logic circuit 330, and a 4:1 selector 340; an ADC 345; a fine phase alignment circuit 350 comprising an interpolator 355, a timing error estimator 365, and a loop filter 370; a clock 320; and a comparator 360 having a recovered data output 380. These components may be arranged as shown in FIG. 7, and may be substantially the same as the corresponding components of the coarse phase alignment circuit shown in FIG. 6 except as follows. First, FIG. 7 includes outputs $Q_3$, $Q_2$, $Q_1$ and $Q_0$ from flip-flops 315 for correlation with FIGS. 8 and 9, discussed further below. Second, the N and M values have been assigned as 4 and 1, respectively. Thus, the tapped delay line 310 delays the received signal 300 by 0, 0.25 $T_b$, 0.50 $T_b$, and 0.75 $T_b$, a 4 to 1 selector 340 replaces N to M selector 240, and two selection signals, $SEL_1$ and $SEL_0$, are sent from coarse phase alignment circuit 305 to 4 to 1 selector 340. Two selection signals, $SEL_1$ and $SEL_0$, may be used to designate 1 of the 4 delayed signals as the signal to pass to ADCs 345. In another embodiment, more delayed signals are used and, consequently, more selection signals may be required to instruct the N to M selector 240 which delayed signal to pass to ADCs 245. In yet another embodiment, only two delayed signals are used and, consequently, only one selection signal may be needed to select the appropriate delayed signal. Third, the ADC 345 may receive a doubled signal from the clock 320. The doubled signal from the clock 320 accounts for the reduction in ADCs 245 from M to 1. If M=2, more delayed versions of the received signal would be sampled and two ADCs with sampling rates equal to bit rate could be used instead of one ADC with a sampling rate twice the bit rate.

Figure 9:
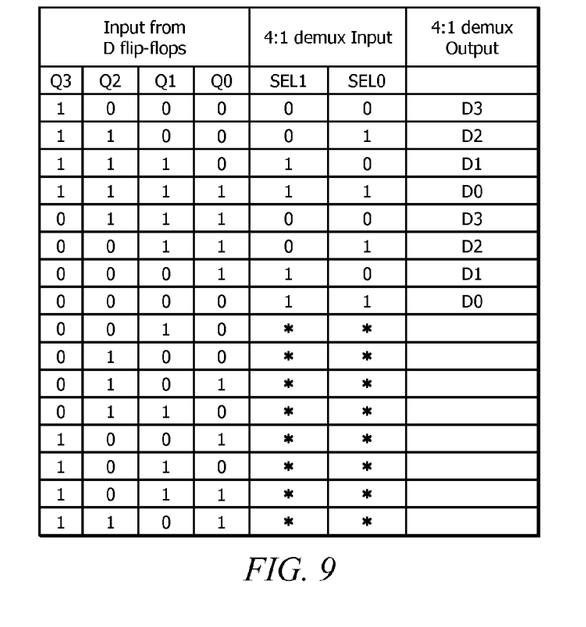
FIG. 9 depicts a truth table corresponding to FIGS. 7 and 8.

FIG. 8 depicts the timing diagram for the delayed versions of the receiver preambles for received signal 300 of FIG. 7, as well as their alignment with respect to the clock 320 and a half-rate clock 320 as input to the flip-flops 315. FIG. 9 depicts a truth table corresponding to FIGS. 7 and 8. The coarse phase alignment logic circuit 330 may select one of the delayed versions of the received signal 300 using the following logic expression:

$$S1 = Q_3 Q_2 Q_1 Q_0 + \overline{Q_3} \overline{Q_3} \overline{Q_1} \overline{Q_0}$$

$$S0 = \overline{Q_3 \oplus Q_2} + \overline{Q_1 \oplus Q_0}$$

(where ⊕ denotes exclusive or) or the truth table depicted in FIG. 8, where $Q_3$, $Q_2$, $Q_1$ and $Q_0$ are the inputs to the coarse phase alignment logic circuit 330 which are output from the flip-flops 315, as depicted in FIG. 7. The input values ($Q_3$, $Q_2$, $Q_1$ and $Q_0$) in the lower portion of the truth table of FIG. 8 do not occur in real implementations, and consequently are disregarded. In an embodiment, the coarse phase alignment logic circuit 330 may align the received signal 300 and the clock 320 (e.g., the center of the bit period is coarsely aligned with the falling edge of the half-rate clock 320), as shown in FIG. 8, within $0.25\ T_b$. If the coarse phase alignment logic circuit 330 determines, for example, that delayed signal D3 most closely aligns with the falling edge of the half-rate clock 320, as shown in FIG. 8, $SEL_1$ and $SEL_0$ may lock as 0/0, as shown in FIG. 9. In addition, the coarse phase alignment logic circuit 330 may send selection signals $SEL_1$ and $SEL_0$ to the 4 to 1 selector 340, as shown in FIG. 9, informing the 4 to 1 selector 340 which delayed signal from the tapped delay line 310 should be passed to the ADC 345. After the preamble, the phase alignment logic may lock, and the selection signals $SEL_1$ and $SEL_0$ may remain constant over the remaining burst period.

Figure 10:
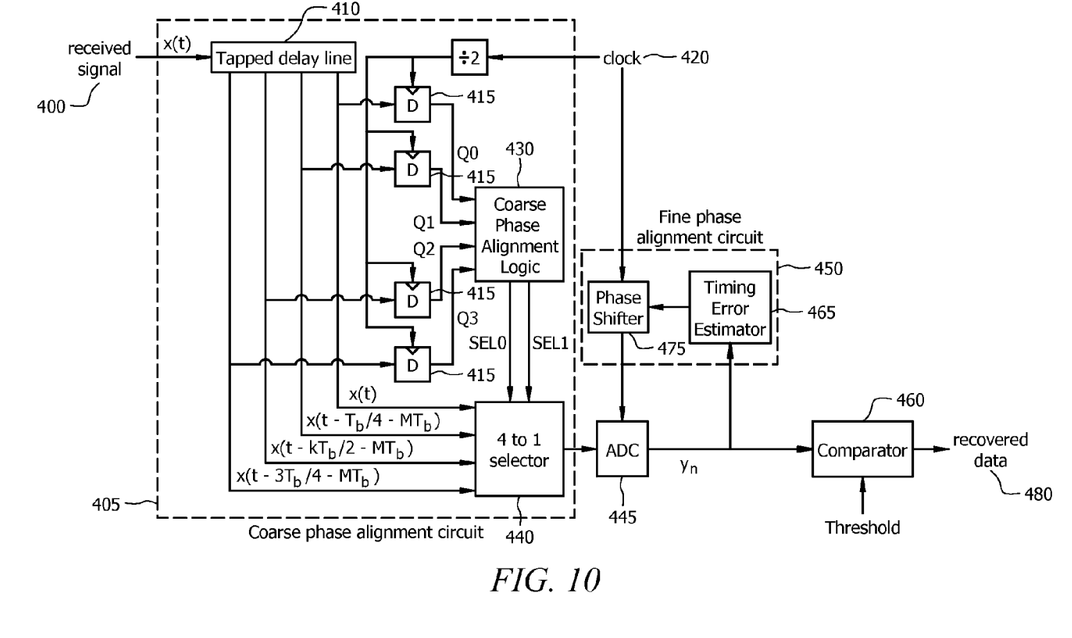
FIG. 10 depicts a schematic diagram of another embodiment of a hybrid timing and data recovery for burst-mode receiver.

FIG. 10 depicts a schematic diagram of still another embodiment of a hybrid timing and data recovery for burst-mode receiver, which may be used in the OLT and/or ONU described above. The hybrid timing and data recovery for burst-mode receiver of the depicted embodiment comprises: a received signal 400, a coarse phase alignment circuit 405 comprising a tapped delay line 410, a plurality of flip flops 415, a coarse phase alignment logic circuit 430, and a 4:1 selector 440; an ADC 445; a fine phase alignment circuit 450 comprising a timing error estimator 465 and a phase shifter 475; a clock 420; and a comparator 460 having a recovered data output 480. These components may be arranged as shown in FIG. 10, and may be substantially the same as the corresponding components of the coarse phase alignment circuit shown in FIG. 6 except as follows. Fine phase alignment circuit 450 comprises a timing error estimator 465 and a phase shifter 475 that may phase-shift clock 420 input to ADC 445. The amount of phase shift may be proportional to the timing error produced by timing error estimator 450, and phase shifter 475 may be adjusted to finely align the sampling time of ADC 445. A Mueller and Muller algorithm can be used to estimate the timing error, $e_n$, with one sample per bit, as given by:

$$e_n = (y_n \cdot \hat{y}_{n-1}) - (\hat{y}_n \cdot y_{n-1})$$

wherein $y_n$ is the current sample, $y_{n-1}$ is the previous sample, $\hat{y}_n$ is the decision made by the current sample, and $\hat{y}_{n-1}$ is the decision made by the previous sample. Certain embodiments further utilize a phase shifter 475 on the clock path, the signal path, or both. When a phase shifter 475 is located on the signal path, the phase shifter may optionally be located prior to the tap delay line 410 or between the ADC 445 and the selector 440.

Various other alternatives embodiments of the hybrid timing and data recovery for burst-mode receiver are within the scope of this disclosure. In one embodiment, coarse phase alignment logic circuit 230 samples un-delayed received signal 200 using delayed versions of the clock signal, where each clock signal is delayed by a fraction of the bit period. Such an embodiment functions in substantially the same way as detailed above, but selects the delayed clock signal most closely approximating received signal 200 to align the coarse phase.

In another embodiment, the alignment accuracy of the received data and the receiver clock may be increased by using more delay lines, e.g., N=8, and any number of delay lines may be used. Suitable coarse phase alignment can be achieved with 16 or fewer delay lines, and for example with four as described above. Other embodiments reduce the delay lines, e.g., N=2, to lower costs and/or processing requirements.

In other embodiments, timing error estimator 265 may use other algorithms instead of or in conjunction with the algorithms disclosed herein as will be understood by one having ordinary skill in the relevant art. In still other embodiments, different loop filters may replace loop filter 270 based on the desired convergence time and jitter tolerance of the digital timing recovery loop as will be understood by one having ordinary skill in the relevant art. Acceptable loop filters include various low pass filters known in the art.

Figure 11:
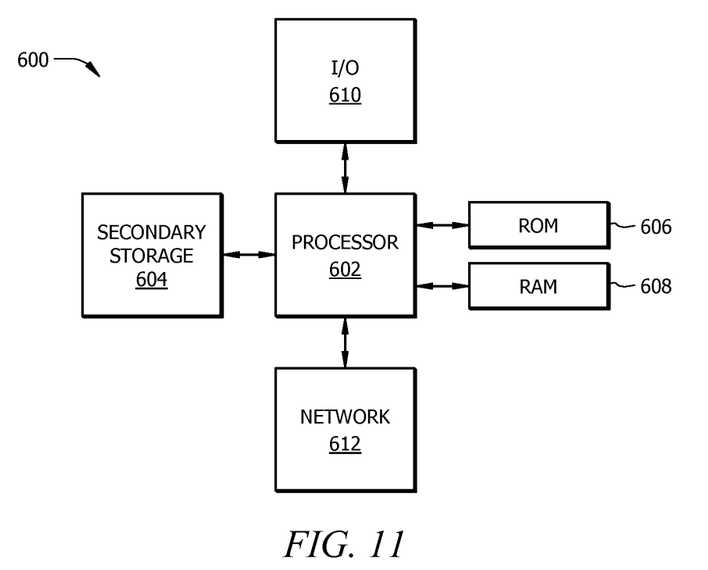
FIG. 11 is a schematic diagram of an embodiment of a general-purpose computer system.

The schemes described above may be implemented on any general-purpose network component, such as an OLT, ONU or network component with sufficient processing power, memory resources, and network throughput capability to handle the necessary workload placed upon it. FIG. 11 illustrates a typical, general-purpose network component or computer system 600 suitable for implementing one or more embodiments of methods disclosed herein, such as one or more steps of method 200. The general-purpose network component or computer system 600 includes a processor 602 (which may be referred to as a central processor unit or CPU) that is in communication with memory devices including secondary storage 604, read only memory (ROM) 606, random access memory (RAM) 608, input/output (I/O) 610 devices, and network connectivity devices 612. The processor 602 may be implemented as one or more CPU chips, or one or more cores (e.g., a multi-core processor), or may be part of one or more application specific integrated circuits (ASICs) and/or digital signal processors (DSPs). The processor 602 may be configured to implement any of the schemes described herein, including one or more steps of the described signal processing method, which may be implemented using hardware, software, or both.

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus for coarse phase alignment of an analog signal comprising:
   a tapped delay line configured to output N delayed signals, wherein each delayed signal has a delay based on a bit period, N, and M;
   a coarse phase alignment logic circuit coupled to the tapped delay line; and
   a selector coupled to the tapped delay line and the coarse phase alignment logic circuit and configured to receive the N delayed signals, wherein N is an integer greater than 1 and M is an integer number of signals output from the apparatus.

2. The apparatus of claim 1, wherein the tapped delay line is coupled to an optical receiver.

3. The apparatus of claim 1, wherein the coarse phase alignment logic circuit is coupled to a clock.

4. The apparatus of claim 1, further comprising a plurality of flip-flops coupled to the tapped delay line such that the flip-flops are positioned between the tapped delay line and the coarse phase alignment logic circuit, and wherein the coarse phase alignment logic circuit is positioned between the flip-flops and the selector.

5. The apparatus of claim 4, wherein from 2 to 16 flip-flops are positioned between the tapped delay line and the coarse phase alignment logic circuit.

6. The apparatus of claim 5, wherein four flip-flops are positioned between the tapped delay line and the coarse phase alignment logic circuit.

7. A method of burst mode clock and data recovery at an Optical Line Terminal (OLT) in a Passive Optical Network (PON), the method comprising:
   receiving an upstream analog signal;
   aligning a coarse phase for the upstream analog signal using a fractional delay circuit to create at least one coarse phase aligned analog signal, wherein the aligning comprises creating, from the upstream analog signal, N delayed signals, wherein each delayed signal has a delay based on a bit period, N, and M, wherein N is an integer number of first desired signals output to a selector, and wherein M is an integer number of second desired signals output to at least one analog-to-digital converter (ADC);
   converting the at least one coarse phase aligned analog signal to at least one digital signal;
   aligning a fine phase for the at least one digital signal to create a fine phase aligned signal; and
   outputting a recovered data signal based on the fine phase aligned signal.

8. The method of claim 7, wherein the aligning further comprises:
   comparing fractionally delayed versions of the upstream analog signal to a system clock; and
   selecting a single fractionally delayed version of the upstream signal for usage in data recovery.

9. The method of claim 7, wherein converting is accomplished by the at least one ADC running at a nominal bit rate.

10. The method of claim 7, wherein the method is accomplished in less than a 44 bit period.

11. The method of claim 7, wherein M is less than N.

12. The method of claim 11, wherein M is 1.

13. An apparatus for timing and data recovery for burst mode receivers comprising:
   a receiver;

a coarse phase alignment logic circuit coupled to the receiver and comprising:
  a tapped delay line coupled to the receiver;
  a plurality of flip-flops coupled to the tapped delay line such that the tapped delay line is positioned between the receiver and the flip-flops, wherein the flip-flops are further coupled to a clock;
  a coarse phase alignment logic circuit coupled to the flip-flops such that the flip-flops are positioned between the tapped delay line and the coarse phase alignment logic circuit; and
  a selector directly connected to the tapped delay line and coupled to the coarse phase alignment logic circuit, wherein the coarse phase alignment logic circuit is positioned between the flip-flops and the selector, wherein the tapped delay line is positioned between the receiver and the selector;
an analog-to-digital converter (ADC) coupled to the coarse phase alignment logic circuit such that the coarse phase alignment logic circuit is positioned between the receiver and the ADC; and
a fine phase alignment circuit coupled to the ADC such that the ADC is positioned between the coarse phase alignment logic circuit and the fine phase alignment circuit, wherein the fine phase alignment circuit is configured to produce a recovered data output.

14. The apparatus of claim 13, wherein the tapped delay line has from 2 to 16 taps.

15. The apparatus of claim 13, wherein the fine phase alignment logic circuit comprises:

an interpolator coupled to the ADC such that the ADC is positioned between the coarse phase alignment logic circuit and the interpolator;
  a timing error estimator coupled to the interpolator such that the interpolator is positioned between the timing error estimator and the ADC; and
  a loop filter coupled to the interpolator and the timing error estimator such that the loop filter is positioned between the interpolator and the timing error estimator.

16. The apparatus of claim 15 further comprising a comparator coupled to the interpolator such that the interpolator is positioned between the comparator and the ADC, wherein the timing error estimator is positioned between the comparator and the loop filter.

17. The apparatus of claim 13, wherein the fine phase alignment logic circuit comprises:

a phase shifter coupled to the clock and to the ADC, wherein the phase shifter is positioned between the clock and the ADC, and wherein the phase shifter is not directly connected to the coarse phase alignment logic circuit; and
  a timing error estimator coupled to the phase shifter and the ADC.

18. The apparatus of claim 17 further comprising a comparator coupled to the ADC and the timing error estimator, wherein the ADC is positioned between the comparator and the selector, and wherein the timing error estimator is positioned between the comparator and the phase shifter.

19. The apparatus of claim 18, wherein the fine phase alignment circuit is configured to use a Mueller-Muller algorithm or a Gardner algorithm for timing error estimation.

\* \* \* \* \*